(12) United States Patent
Wobben

(10) Patent No.: US 6,661,111 B1
(45) Date of Patent: Dec. 9, 2003

(54) WIND POWER PLANT PROVIDED WITH CAST SHADOW CONTROL

(76) Inventor: Aloys Wobben, Argestrasse 19, Aurich D-26607 (DE)

( * ) Notice: Subject to any disclaimer, the term of this patent is extended or adjusted under 35 U.S.C. 154(b) by 0 days.

(21) Appl. No.: 10/019,604
(22) PCT Filed: Mar. 11, 2000
(86) PCT No.: PCT/EP00/02158
§ 371 (c)(1),
(2), (4) Date: May 13, 2002
(87) PCT Pub. No.: WO01/02723
PCT Pub. Date: Jan. 11, 2001

(30) Foreign Application Priority Data

Jun. 30, 1999 (DE) .......................................... 199 29 970

(51) Int. Cl.⁷ .................................................. F03D 7/00
(52) U.S. Cl. .............................. 290/43; 290/44; 290/55
(58) Field of Search ............................. 290/43, 44, 54, 290/55

(56) References Cited

U.S. PATENT DOCUMENTS

| | | | | |
|---|---|---|---|---|
| 4,651,017 A | * | 3/1987 | Longrigg ..................... | 290/44 |
| 5,223,781 A | * | 6/1993 | Criswell et al. ............. | 322/2 R |
| 5,852,353 A | * | 12/1998 | Kochanneck ................ | 318/558 |
| 6,201,313 B1 | * | 3/2001 | Nakamats ..................... | 290/54 |
| 6,225,705 B1 | * | 5/2001 | Nakamats ..................... | 290/43 |

FOREIGN PATENT DOCUMENTS

DE 19928048 A1 12/1999

OTHER PUBLICATIONS

Verkuijlen et al., "Shadow Effect of Windmills," *Energiespectrum* 7:297–302, Oct.–Nov. 1983.
Verkuijlen et al., "Shadow Effect of Windmills," *Institute of Electrical Engineers*: Database Accession No. 2208473: Oct.–Nov. 1983.
Verkuijlen et al., "Shadow Hindrance by Wind Turbines," *European Wind Energy Conference 1984*: 356–361, Oct. 22–26, 1984.
"Shadow Casting from Wind Turbines," *Danish Wind Turbine Manufacturers Association Web Site*: http://www.windpowet.dk/tour/env/shadow/index.htm, Jun. 6, 2000.

* cited by examiner

Primary Examiner—Nicholas Ponomarenko
(74) Attorney, Agent, or Firm—Seed IP Law Group PLLC

(57) ABSTRACT

In the planning and erection of wind power installations the visual impairments to be expected of the wind power installation on the environment are playing an increasingly important part in terms of approval and acceptance. If for example a wind power installation is positioned in the proximity of a residential building, it is possible in adverse positions of the sun, that the wind power installation or the rotor thereof is between the sun and the residential building. If the sunshine is not affected by clouds the rotor as it rotates continuously casts a shadow thereof on the plot of land. The shadow projection caused by the wind power installation on the adjacent area of ground is often perceived by the residents as being a very severe nuisance. Even if the wind power installation satisfies the requirements in terms of legal requirements for planning permission, there is however not always a guarantee that the unwanted shadow effect is prevented.

The object of the present invention is to provide a wind power installation by means of which the problems of casting shadows are overcome.

1. A method of operating a wind power installation which shuts down at a predetermined position of the sun if the light intensity is above a predetermined value (shutdown intensity).

9 Claims, 2 Drawing Sheets

WIND POWER PLANT PROVIDED WITH CAST SHADOW CONTROL

In the planning and erection of wind power installations the visual impairments to be expected of the wind power installation on the environment are playing an increasingly important part in terms of approval and acceptance. If for example a wind power installation is positioned in the proximity of a residential building, it is possible in adverse positions of the sun, that the wind power installation or the rotor thereof is between the sun and the residential building. If the sunshine is not affected by clouds the rotor as it rotates continuously casts a shadow thereof on the plot of land. The shadow projection caused by the wind power installation on the adjacent area of ground is often perceived by the residents as being a very severe nuisance. Even if the wind power installation satisfies the requirements in terms of legal requirements for planning permission, there is however not always a guarantee that the unwanted shadow effect is prevented.

The object of the present invention is to provide a wind power installation by means of which the problems of casting shadows are overcome.

In accordance with the invention that object is attained by a method of operating a wind power installation as set forth in claim 1. Advantageous developments are set forth in the appendant claims.

The invention is based on the realisation that casting of shadows can only occur in a given position of the sun, when the situation involves direct solar irradiation with a high level of light intensity. As is known, the position of the sun depends on the time of the year and the time of day, and can be ascertained by means of measurement or calculation programs for any relevant immission point (that is the location [region] at which shadow casting can occur). Accordingly, the basis for shadow shut-down of a wind power installation are the calculated times in which a shadow casting effect can occur in relation to a neighbouring area (at the immission point), by virtue of the position of the sun and the geographical arrangement of the installation. In parallel with the predetermined times related to the position of the sun, the light intensity is ascertained by way of a light sensor and thus the plausibility of a shadow-casting effect occurring is checked. It is only if, during the predetermined times in relation to the position of the sun, at which a shadow-casting effect at the immission point is possible, the level of brightness is sufficient to cause a shadow to be cast, that the wind power installation shadow shut-down mode occurs.

Shadow shut-down can be implemented in the case of the wind power installation according to the invention by way of an input/display device (LC-display). For that purpose the settings or values of the current and the shut-down light intensity can be read off. In addition, it is possible to ascertain from the display, the status which the shut-down procedure involves at the current time, that is to say, whether it is switched on or off, or is active or inactive. Input of the shut-down times can be predetermined or loaded, in a separate menu.

The "shadow shut-down" mode involves a display of the parameters comprising current light intensity (value in %), shadow shut-down light intensity (value in %), shadow shut-down (on/off) or shadow shut-down (active/inactive). In that respect, the shut-down light intensity is a value in respect of the light intensity, at which the wind power installation is to be shut down. If for example a wind power installation is very close to an affected immission point, then even with a slightly cloud-covered sky, the shadow-casting effect which occurs is a nuisance. Therefore in that situation (the wind power installation is very close to the immission point in question) the installation should involve a lower value for the level of shut-down intensity, than the situation where the immission point is further away from the wind power installation. In regard to light intensities, a low percentage value denotes a low level of light intensity (for example when the sky is overcast) while a high percentage value denotes a strong light intensity (for example direct sunshine), which suggests that solar irradiation is not disturbed by the sky being overcast with cloud or by mist. Shadow shut-down (on/off) indicates whether that is activated at all. Shadow shut-down (active/inactive) specifies whether the installation is at the present time shut-down because a shadow is being cast.

If, for the current level of light intensity, a value above the shut-down light intensity is ascertained and if at the same time there is identity in the inputted time window which takes account of solar irradiation or the position of the sun, the wind power installation automatically stops if shadow shut-down is switched to "on". While the installation is stopped by virtue of a shadow being cast, a corresponding status message appears in the main menu of the display device.

The value of the shut-down light intensity can be altered by suitable inputs. As the shadow of the rotor blades becomes weaker with increasing distance in relation to the immission point and at some point becomes totally insignificant, the shadow-casting effect becomes detrimental, with increasing distance, only if a higher level of light intensity is involved. On average 60% can be fixed as a meaningfully set value for the level of shut-down light intensity. The shut-down light intensity however has to be adjusted in accordance with respective local factors because the level of shut-down light intensity also depends on the geographical factors on site.

The light conditions are also continuously further measured after the installation stops. The wind power installation re-starts automatically if the level of light intensity is below the shut-down level for a duration of more than 2 minutes, preferably 10 minutes, or if the shadow has moved (by virtue of a change in the position of the sun or because of the path of movement of the sun) to such an extent that the immission point is no longer suffering from adverse effects due to a shadow being cast.

The times for occurrence of the shadow being cast are edited for input by way of a menu. In that respect the values are composed of a starting date and an end date, and a start time and a stop time. Inputted values can be at any time altered, expanded or erased, and that can be effected by means of manual input or by reading in a suitable program.

The times relating to the position of the sun are inputted in the format of winter time. Likewise leap years are taken into account in the programming.

The times for shadow shut-down can always be called up at the current time or subsequently, by way of remote monitoring, so that it is possible to implement verification for observation purposes.

The invention is described in greater detail hereinafter by means of an embodiment.

FIG. 1 shows a wind power installation, for example of type E-40 from Enercon, which is at a given distance E from a house 2. The house 2 is also referred to as the immission point A.

When in the morning the sun rises or in the wintertime throughout the entire day, the sun—always as seen from the immission point A—only rises to a low height so that, at the position I of the sun, there is an angle of incidence βI.

If the sun rises higher—position II of the sun—that involves a different angle of incidence βII for the rays of the sun. Those angles of incidence βI and βII (any other angles of incidence are also possible) of the rays of the sun also establish when shadow can be cast directly at the immission point A.

Figure 1:
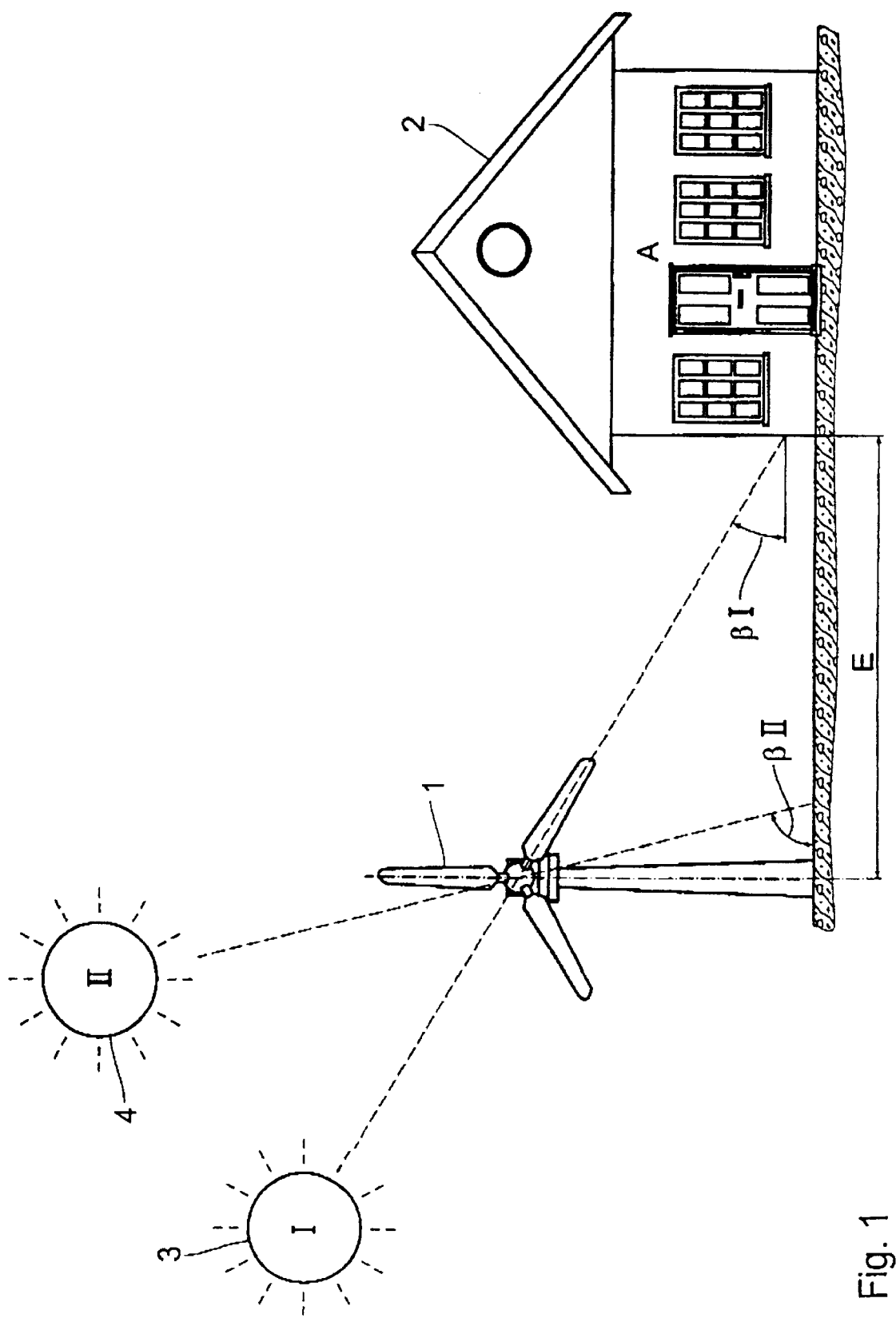
FIG. 1 shows a side view of the effect of casting shadow, at two different positions of the sun.
Figure 2:
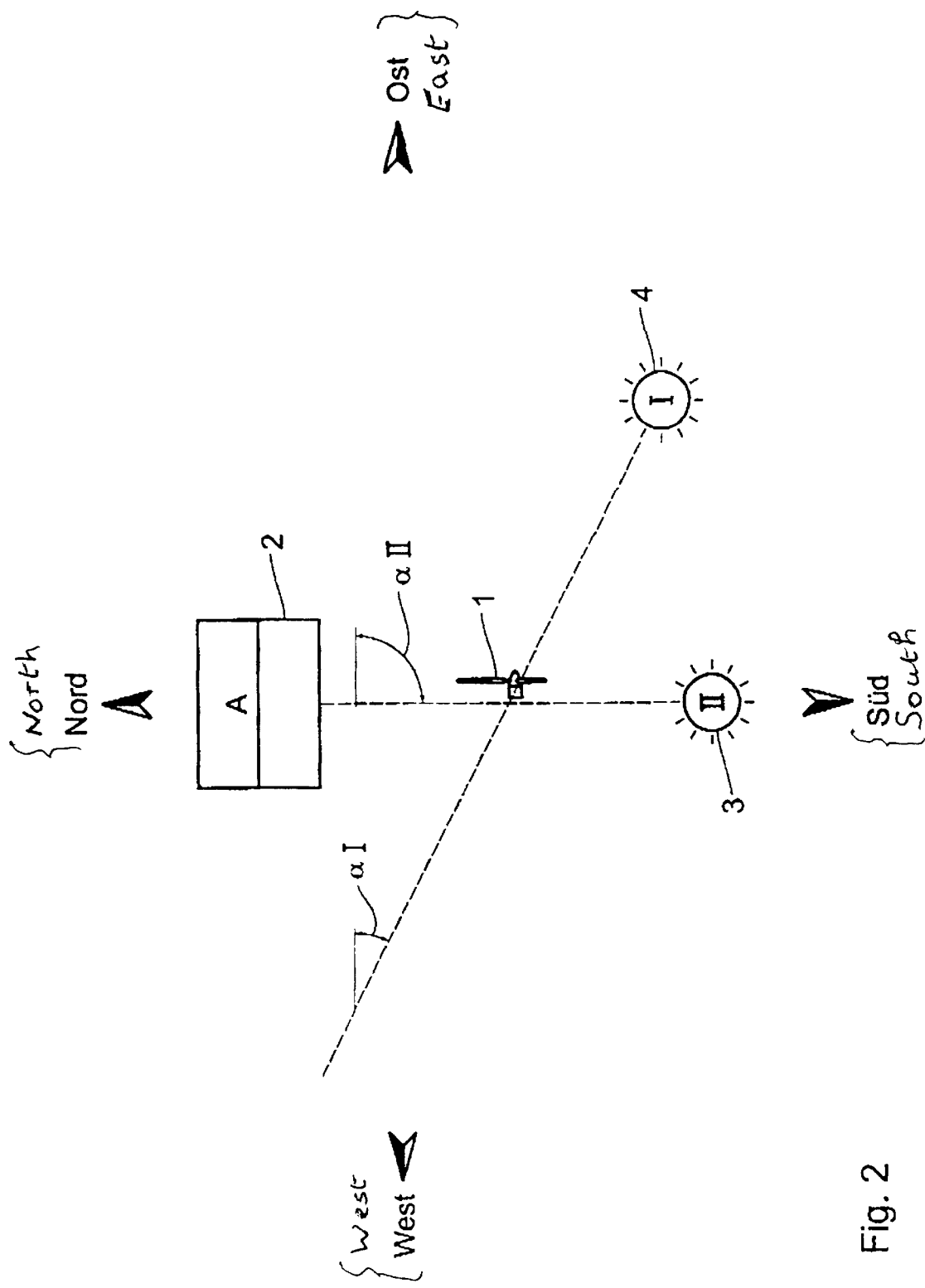
FIG. 2 shows a plan view of the casting of shadow, also at two different positions of the sun.

The scenario shown in FIG. 1 is shown once again in FIG. 2 from a different perspective. When the sun (once again considered from the immission point) is in the South-East, the rays of the sun impinge on the wind power installation at an angle αI, in relation to the West-East axis.

As soon as the sun has moved further towards the South, the rays of the sun are incident on the wind power installation 1 at a different angle αII.

It is only if the position of the sun which is a function of the geographic location on the Earth and the angles of incidence α and β is such that the shadow of the wind power installation is incident on the immission point A, that the wind power installation is shut down, if the level of light intensity at the immission point is above a predetermined value, more specifically a shut-down light intensity. The shut-down intensity depends not only on the incidence of light, but also the distance in relation to the immission point. If a wind power installation is very close to the immission point affected, then the shadow-casting effect which occurs can be a nuisance, even when the sky is slightly covered with cloud. In such a situation therefore the wind power installation should involve a lower value for the shut-down intensity, than for the situation where the immission point is further away from the wind power installation.

If the level of light intensity is below the shut-down intensity, the wind power installation—independently of the position of the sun—is not shut down and can continue to generate electrical energy. Such a situation occurs in particular when the sky is very cloudy.

The further away that a wind power installation is arranged from the immission point, the correspondingly shorter are the times within which a shadow-casting effect can occur at all at the immission point.

The level of light intensity can be measured directly at the immission point A or at the wind power installation. As the immission point and the wind power installation are relatively close together, the light intensity values measured for the wind power installation are also valid for the immission point A.

The level of light intensity itself can be measured for example with a light sensor whose values are processed by a data processing apparatus which is associated with the wind power installation. Also programmed in that data processing apparatus are the positions of the sun at which a shadow-casting effect can occur at the immission point. It is readily apparent that these "shadow-casting" positions of the sun are different for each wind power installation and therefore the data processing apparatus has stored for each wind power installation a different position of the sun at which the shadow-casting effect can occur.

It will be appreciated that it is also possible that, in the case of a wind park arranged in the proximity of an immission point where shadow casting is to be avoided, control can be implemented by a central data processing apparatus which switches off respective individual wind power installations of the wind park when the wind power installations cause a shadow to be cast at the immission point.

If a shadow-casting effect occurs, the wind power installation is not shut down immediately, but only if the shadow-casting effect has occurred over a certain time, for example between 5 and 10 minutes.

When the shadow-casting effect no longer exists, for example because clouds have moved between the sun and the wind power installation, it can also be provided that the wind power installation is not started up again immediately, but instead there is a certain waiting time, for example between 5 and 10 minutes, and the wind power installation is switched on and starts to run again, only when the level of light intensity was below the shut-down intensity, within that certain waiting time.

It is also possible, besides shut-down positions of the sun which have already been programmed, to program further positions of the sun for the wind power installation, if that is necessary.

What is claimed is:

1. A method of operating a wind power installation which shuts down at a predetermined position of the sun if the light intensity is above a predetermined value (shut-down intensity).

2. A method according to claim 1 characterised in that the wind power installation is shut down at least at times at a predetermined position of the sun.

3. A method according to claim 1 or claim 2 characterised in that the predetermined positions of the sun at which installation shut-down can be triggered are stored in the wind power installation or in a control and/or data processing apparatus associated therewith.

4. A method according to one of the preceding claims characterised in that the level of light intensity is detected by means of a light sensor and on the basis of the detected light intensity, by means of a data processing program, an evaluation is made as to whether there is at all a solar radiation effect which is sufficient to cause a shadow to be cast.

5. A wind power installation for carrying out the method according to one of the preceding claims comprising a data processing apparatus which controls the wind power installation and in which are stored the positions of the sun or values which are representative in relation thereto, at which shut-down of the installation can occur.

6. A wind power installation according to claim 5 characterised in that the wind power installation is coupled to a light sensor, by means of which the respectively current light intensity or the light intensity as ascertained over a certain time is measured, and that the data ascertained by the light sensor are processed by the data processing apparatus and wind power installation shut-down takes place if when a predetermined position of the sun occurs, the light intensity is above a predetermined value at which it is to be expected that the wind power installation casts a shadow.

7. A wind power installation according to one of the preceding claims characterised in that the installation has a display device, by means of which the status of shadow shut-down can be reproduced.

8. A wind power installation according to one of the preceding claims characterised in that besides the stored positions of the sun, it is possible to store new positions of the sun, for further immission points, which is implemented by means of suitable programming.

9. A wind park having a plurality of wind power installations according to one of the preceding claims.

* * * * *